H. M. LOURIE.
TIRE SETTING MACHINE.
APPLICATION FILED APR. 6, 1910.
989,913.
Patented Apr. 18, 1911.
2 SHEETS—SHEET 2.
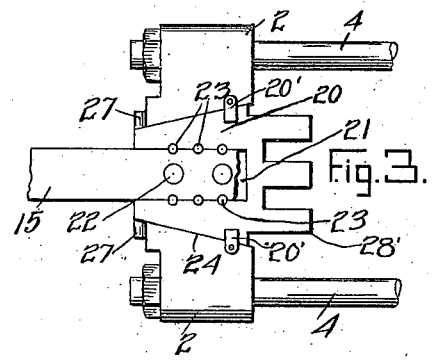
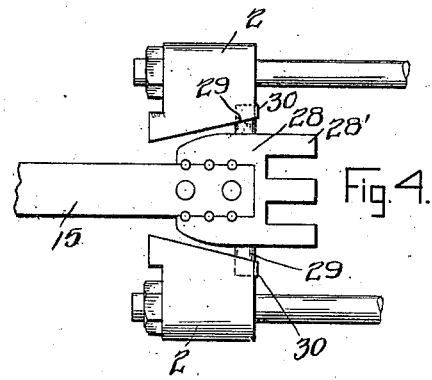
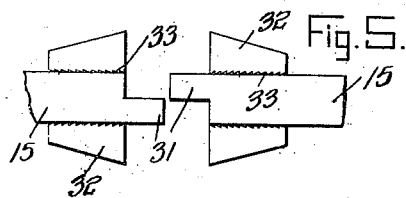
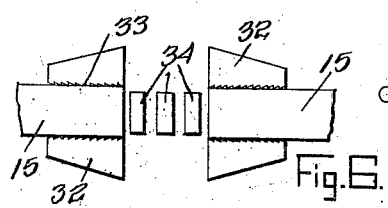
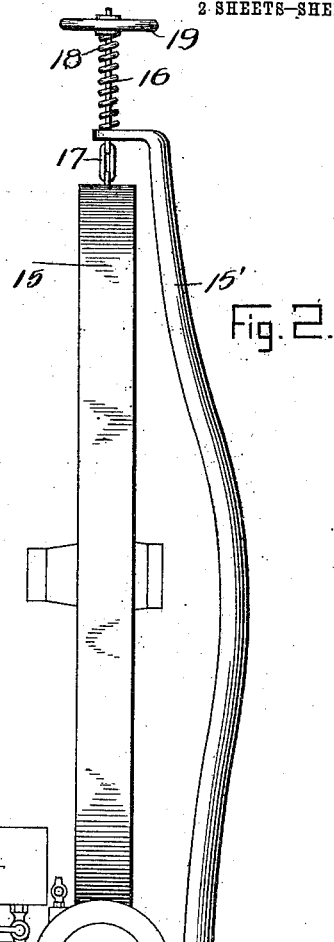
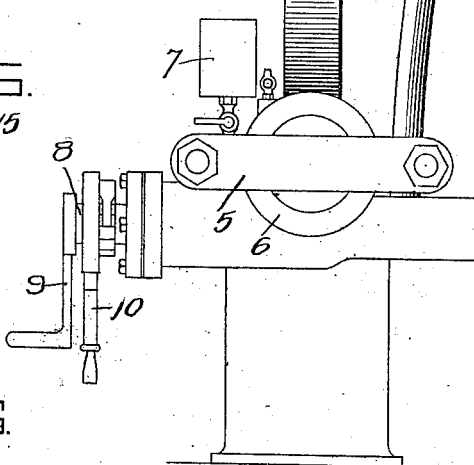

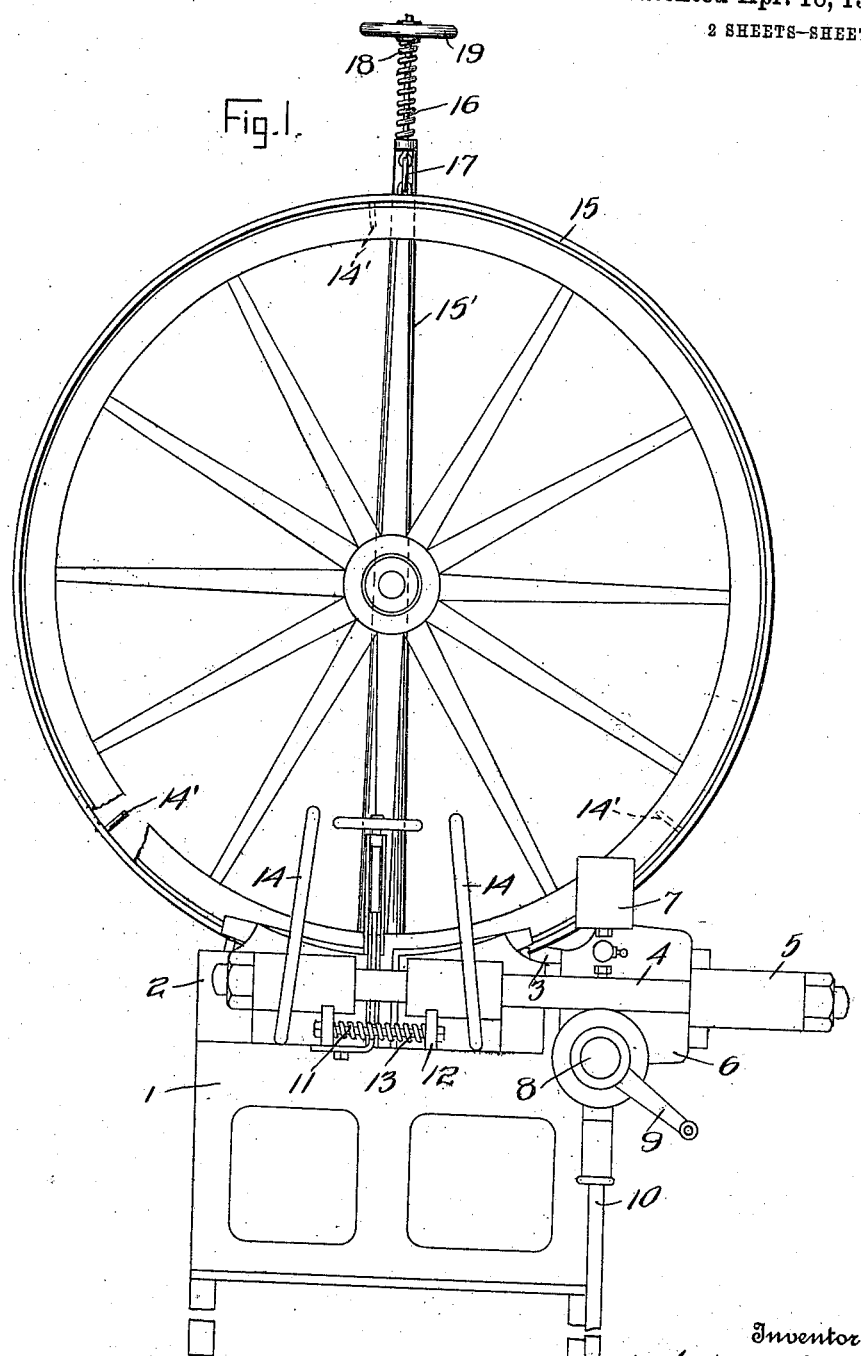

UNITED STATES PATENT OFFICE.

HERBERT M. LOURIE, OF KEOKUK, IOWA, ASSIGNOR TO LOURIE MANUFACTURING CO., A CORPORATION OF ILLINOIS.

TIRE-SETTING MACHINE.

989,913.      Specification of Letters Patent.      Patented Apr. 18, 1911.

Application filed April 6, 1910. Serial No. 553,778.

*To all whom it may concern:*

Be it known that I, HERBERT M. LOURIE, a citizen of the United States, and resident of Keokuk, in the county of Lee and State of Iowa, have invented certain new and useful Improvements in Tire-Setting Machines, of which the following is a specification.

The present invention relates to machines for setting tires on vehicle or other wheels and has reference to that particular type of tire setter disclosed in United States Patent No. 933,834 to Henderson and Lourie, and dated September 14, 1909, and of which patent the structure herein disclosed contemplates a further improvement.

The object of this improvement is to adapt a machine of the aforesaid type capable of shrinking a broad thin tire onto the wheel without distorting or in any other manner injuring the tire, as would likely be the case in machines of the edge gripping principle. To this end the present improvement employs the idea of utilizing, with the machine above mentioned, a circumferential band designed to receive the wheel and the tire to be set thereon, and capable of being contracted or circumferentially adjusted whereby to shrink the tire to the wheel; and co-operating therewith is a means for variably accommodating the entire circumference of the shrinking band to wheels of different diameters, and likewise insuring a true periphery to the tire.

The structure of the several elements employed and their manner of assembling is such that they may, without any special adaptation, be used in connection with the machine above referred to, thus affording with these auxiliary parts a single machine capable of various use.

Other and further objects of the invention will appear in the course of the following specification and the novel features thereof set forth in the appended claims.

The accompanying drawings illustrate the preferred manner of constructing the machine, and in the views shown, Figure 1 is a front elevation of the entire machine; Fig. 2 is an end elevation thereof; Fig. 3 is a detail view showing the means for securing the shrinking band; Fig. 4 illustrates a modification of that arrangement shown in Fig. 3, and Figs. 5 and 6 disclose further modifications of these elements of the machine.

Referring to the several figures in further detail and with like characters of reference indicating corresponding parts in the several views shown, the numeral 1 designates the machine frame and has mounted thereon the fixed and movable gripping jaws 2 and 3 respectively; and for imparting the necessary movement to the movable jaws the same are connected by means of rods 4 to the cross head 5, which in turn is secured to the rod of a piston within the compression cylinder 6. The oil or other compression fluid used within the cylinder 6 is supplied thereto from the reservoir 7, and for effecting the compression of the fluid, there is a piston 8 adapted to be actuated through the medium of the crank 9 and ratchet lever 10, although any suitable hydraulic pump may be used instead of the displacer. The means for retracting the compression members consists of the spiral spring 11 which is connected with said jaws through the medium of the lugs 12 and the bar 13, and for placing the jaws evenly with respect to each other whereby they may uniformly perform their function, said jaws are preliminarily set to position through the medium of the levers 14. The mechanism thus far described and the manner of its operation is substantially that shown and described in U. S. patent above referred to, and no claim thereon is, therefore, made in the present application.

The improvement residing in this invention consists in providing a circumferential shrinking band 15 whose structure is that shown in Figs. 1 and 2, and which at its lower portion, or that part between the clamping jaws or blocks 2 and 3, is divided whereby the band may be contracted or expanded to reduce the diameter of a tire on a wheel, thereby setting it to accommodate wheels of various diameters, as will be obvious.

The shrinking band is supported against sagging and in the vertical position with respect to the frame through the medium of the upright bar 15', and in order that the band may at all times be in position for the shrinking operation, there is provided therefor a resilient hanger by which it is supported from the upright 15'. Said hanger consists of a screw-threaded rod 16 connected to the band by a link 17 and which carries a resilient supporting spring 18 whose tension is regulated through the medium of an adjusting wheel 19. At suitable intervals throughout its circumference, said band is provided with stops or projections 14' arranged on one side of said band so that said band may receive and properly hold therein the wheel and tire to be set thereon.

The ends of the band 15 are provided with means for effecting its contraction and since this means is identical for both, the description of one will here suffice for the present purpose. Each end of the band is provided with a gripping head 20 to which it is secured within a counter-sunk seat 21 by the central rivets 22 and the side rivets 23, which latter are relatively smaller and have their engagement along the meeting edges of the band and block respectively. The gripping heads are provided with inclined sides or wedges 24 which coöperating with complementary formed surfaces on the jaws 2, affect to move or contract the band through the rods 4 by the hydraulic pressure device. Each of the gripping heads 20 is held within its respective jaws through the medium of clips or buttons 20', said clips being pivotally mounted on the jaws whereby they may be turned out of position, to permit of the removal of the shrinking band. The gripping heads are further provided with lugs 27 which are located behind and immediately adjacent the gripping jaws in order that the ends of the band 15 may be drawn apart when reversing the movement of the machine.

In that structure shown in Fig. 4, the gripping heads 28 are secured to the band in the same manner as that shown in Fig. 3, but instead of being provided with the inclined sides or wedges, that fit perfectly within the jaws of the head blocks, the same are constructed with trunnions 29 that seat within suitable bearings formed in one face of the jaws and for holding the trunnions against unseating, retaining straps 30 are employed. The adjacent ends of the gripping heads 28 are each designed to form complementary portions 28' adapted to inter-engage when the band is contracted, as will be understood.

In the arrangement shown in Fig. 5, the meeting ends of the band 15 are rabbeted or offset as at 31, whereby to afford inter-engagement between them and for gripping said band the blocks 32 having serrations 33 are employed, and which when acted upon by the jaws 2 will engage the edges of the band 15 and effect the band's contraction.

The idea of having the ends of the band inter-engage and not overlap or abut is to continue or make uniform the vertical support to the tire to be shrunk, thus avoiding any likelihood of giving an uneven periphery to the wheel. In lieu of this manner of accomplishing this, it may be advisable to provide a series of transversely arranged supporting blocks 34 disposed intermediate the ends of the band 15 and sufficiently removed from the path of the latter to avoid arresting their movement. In this way, any bulging or buckling of the portion of the shrunk tire between the gripping jaws would be avoided.

Having thus described my invention, what I claim as new therein and desire to secure by Letters Patent is:—

1. In a tire setting machine, the combination of a frame, a divided circumferential band adapted to receive the wheel and tire to be set thereon, gripping heads having wedge surfaces carried by said band at the ends thereof, adjustable blocks having wedge surfaces adapted to engage with the wedge surfaces of said heads, and means for adjusting said blocks to contract the band whereby to shrink the tire to the wheel.

2. In a tire setter, the combination of a frame, a band adapted to receive the wheel and tire to be set thereon, gripping heads having wedge surfaces carried by the band at the ends thereof, gripping blocks having wedge surfaces adapted to engage with the wedge surfaces of and move said heads, means for moving the gripping blocks, and means whereby the gripping heads accommodate themselves to the adjustment of the band.

3. In a tire setting machine, the combination of a frame, a divided circumferential band adapted to receive the wheel and tire to be set thereon, gripping heads carried by the band at the ends thereof, gripping blocks adapted to carry said gripping heads, said heads being mounted on trunnions in the gripping blocks whereby to accommodate themselves to the variable circumference of the setting band, and means for moving said gripping blocks to contract the band whereby to shrink the tire to the wheel.

4. In a tire setting machine, the combination of a divided circumferential band adapted to receive the wheel and tire to be set thereon, a frame, means for resiliently supporting the band on the frame, whereby to permit of contracting the band, gripping heads carried by the band at the ends thereof, gripping blocks adapted to carry the gripping heads, and means for moving said gripping blocks to contract the band whereby to shrink the tire to the wheel.

5. In a tire setter, the combination of a frame, a band adapted to receive the wheel and tire to be set thereon, gripping heads carried by the band at the ends thereof, gripping blocks adapted to engage with and move said heads, buttons on said blocks adapted to engage with and hold the heads in position between said blocks, means for moving the blocks, and means whereby the gripping heads accommodate themselves to the adjustment of the band.

The foregoing specification signed at Keokuk Iowa this 15th day of February, 1910.

HERBERT M. LOURIE.

In presence of—
 I. F. HURLBURT,
 M. C. KEPPEL.

Copies of this patent may be obtained for five cents each, by addressing the "Commissioner of Patents, Washington, D. C."